(12) United States Patent
Unice et al.

(10) Patent No.: US 10,856,629 B1
(45) Date of Patent: Dec. 8, 2020

(54) CONVERTIBLE TREKKING STAFF

(71) Applicants: Scott Unice, Lindon, UT (US); Cole Unice, Lindon, UT (US); Weston Unice, Lindon, UT (US); Lowe Unice, Lindon, UT (US)

(72) Inventors: Scott Unice, Lindon, UT (US); Cole Unice, Lindon, UT (US); Weston Unice, Lindon, UT (US); Lowe Unice, Lindon, UT (US)

( * ) Notice: Subject to any disclaimer, the term of this patent is extended or adjusted under 35 U.S.C. 154(b) by 0 days.

(21) Appl. No.: 16/681,357

(22) Filed: Nov. 12, 2019

(51) Int. Cl.
*A45B 1/00* (2006.01)
*F16M 13/08* (2006.01)

(52) U.S. Cl.
CPC ............ *A45B 1/00* (2013.01); *A45B 2200/05* (2013.01); *F16M 13/08* (2013.01)

(58) Field of Classification Search
CPC ..... A45B 1/00; A45B 2200/005; F16M 13/08
See application file for complete search history.

(56) References Cited

U.S. PATENT DOCUMENTS

| | | | |
|---|---|---|---|
| 414,903 A * | 11/1889 | Godillot | A45B 3/00 248/188.5 |
| 448,185 A * | 3/1891 | Harders et al. | A45B 1/00 248/461 |
| 464,999 A | 12/1891 | Schneider | |
| 473,357 A | 4/1892 | Servus | |
| 513,058 A | 1/1894 | Rahmer | |
| 648,123 A * | 4/1900 | Goerz | A45B 5/00 248/155 |
| 1,443,432 A | 1/1923 | Peacock | |
| 1,679,267 A * | 7/1928 | Rieger | A45B 5/00 248/155 |
| 5,433,358 A | 7/1995 | Millard | |
| 7,905,667 B2 | 3/2011 | Barker | |
| 2004/0066064 A1 | 4/2004 | Neely | |
| 2005/0207749 A1 | 9/2005 | Barker | |
| 2014/0150834 A1 | 6/2014 | Nootenboom | |
| 2015/0000717 A1 | 1/2015 | Eng | |
| 2015/0056002 A1 | 2/2015 | Olds | |
| 2015/0075576 A1 | 3/2015 | Gullo | |
| 2017/0277021 A1 | 9/2017 | Sultan | |

FOREIGN PATENT DOCUMENTS

| | | |
|---|---|---|
| CN | 201319106 Y | 9/2009 |
| CN | 203215209 U | 9/2013 |
| CN | 204105070 U | 1/2015 |
| CN | 107625245 A | 1/2018 |
| DE | 29718507 U1 | 1/1998 |
| GB | 189505017 A | 1/1896 |
| GB | 191506121 A | 7/1915 |

(Continued)

*Primary Examiner* — Noah Chandler Hawk
(74) *Attorney, Agent, or Firm* — Tyler Jeffs; Fabian VanCott

(57) ABSTRACT

A convertible trekking staff includes a main shaft having an interior cavity that houses two concentric shafts. A first configuration includes a handle device coupled to the main shaft with the two concentric shafts disposed within the interior cavity of the main shaft to form a trekking staff. A second configuration includes an external component coupled to the main shaft in place of the handle device and the two concentric shafts received by an engagement structure on the main shaft so as to define a tripod.

16 Claims, 12 Drawing Sheets

(56) References Cited

FOREIGN PATENT DOCUMENTS

| | | | | |
|---|---|---|---|---|
| GB | 177844 | A | 4/1922 | |
| GB | 177844 | A * | 4/1922 | ............. F16M 13/08 |
| GB | 188153 | A * | 11/1922 | ............... A45B 1/00 |
| GB | 2539476 | A | 12/2016 | |
| JP | H0889321 | A | 4/1996 | |
| JP | H10295423 | A | 11/1998 | |
| JP | 2004077752 | A | 3/2004 | |
| JP | 2006090389 | A | 4/2006 | |
| JP | 2014033924 | A | 2/2014 | |
| KR | 1020060121539 | A | 11/2006 | |
| KR | 1020100116840 | A | 11/2010 | |
| KR | 1020110094482 | A | 8/2011 | |
| KR | 1020150123044 | A | 11/2015 | |
| WO | 2016000275 | A1 | 1/2016 | |

\* cited by examiner

CONVERTIBLE TREKKING STAFF

BACKGROUND

Hikers and climbers use trekking staffs because they are lightweight supports that provide health benefits and stability on rough terrain. A trekking staff may include an elongate shaft that offers a lightweight support for maintaining a stride or pace, providing a boost uphill, and taking shock off knees for a descent, among other benefits.

DETAILED DESCRIPTION

Figure 1:
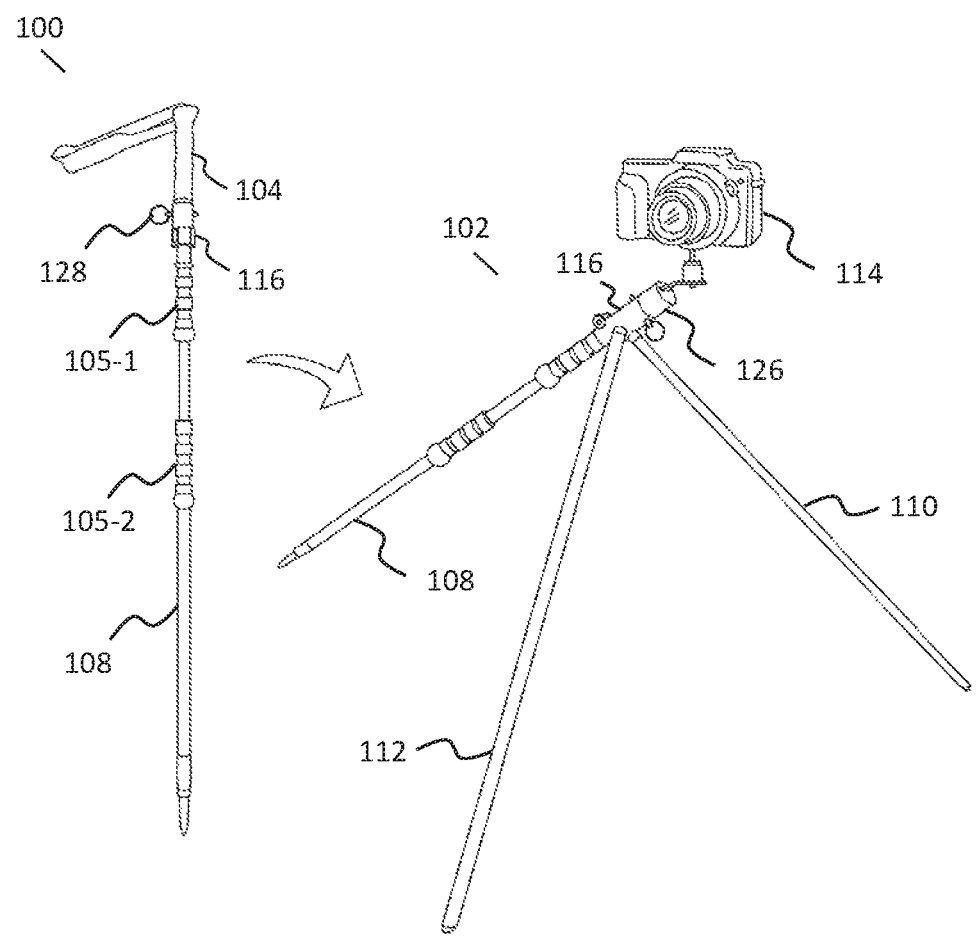
FIG. 1 illustrates a convertible trekking staff in two configurations according to an example of the principles described herein.

The following relates to convertible trekking staffs that provide multiple benefits. Because it may be desirable for hikers to have minimal items to carry, the convertible trekking staff serves more than one purpose.

Trekking staffs are lightweight supports that provide health benefits and stability on rough terrain. Using trekking staffs, hikers and climbers more easily reach high mountain peaks and cross low valleys for once-in-a-lifetime adventures.

While exploring the great outdoors with their trekking staffs, hikers often want to capture the glorious nature about them in photos, video, or other social media. They may be with friends and family and want a memory they can have together and share with others. They may wish to capture pictures that include all members of the group. This desire to take pictures and make memories is further compounded by a growing abundance of selfies, selfie sticks, mobile devices and the like that enable users to readily take their own pictures. With few items stowed away in daypacks, hikers may simply resort to using unstable logs, river bed rocks, or other nearby objects that fail to provide stable support for expensive cameras and mobile devices. Trekking staffs are now described that provide the kind of support needed for photographic endeavors as well as additional transport needs.

The present disclosure describes a convertible trekking staff that includes a main shaft having an interior cavity. A handle device is removably coupled to the main shaft over the interior cavity. At least two concentric shafts are disposed within the interior cavity of the main shaft. A housing adjacent to the handle device includes an engagement structure to receive corresponding shafts to form a tripod. An interface, exposed upon removal of the handle device, receives an external component. A first configuration includes that the handle device is coupled to the main shaft and the two concentric shafts are disposed within the interior cavity of the main shaft to form a trekking staff. A second configuration includes that the external component is coupled to the main shaft in place of the handle device and the two concentric shafts are received by the engagement structure with the main shaft so as to form a tripod.

In one example, the convertible trekking staff includes two shafts removably coupled by a spring-loaded component. A coupling member removably retains the two shafts in a position and prevents axial movement and rotation. A modular handle is attached to a housing at a top of at least one of the shafts. A first configuration includes that the spring-loaded component and the coupling member retains the two shafts in parallel to form the trekking staff. A second configuration includes that a second shaft be released by the spring-loaded component and be rotated relative to a pivot rod around the coupling member. An angular position of the second shaft relative to the main shaft is retained by the coupling member to form a bipod.

In another example, the convertible trekking staff includes a plurality of shafts removably attached together with a locking member. The locking member removably retains the plurality of shafts in a position that prevents axial movement. A modular handle device attaches to a housing at a top of at least one of the shafts. A first configuration includes that the plurality of shafts are retained in parallel to form a trekking staff. A second configuration includes that a first shaft of the plurality of shafts be released from the locking member and be arranged in an angular position with a second shaft of the plurality of shafts to form a supportive stance. At least one or more of the plurality of shafts may be concentric such that the shafts are configured to fit inside each other. Also, the locking member may include at least one or more of a cam lock, snap lock, friction fit, screw fit, twist lock, spring lock, coupling member, and spring-loaded component.

Turning to FIG. 1, a convertible trekking staff 100 is shown it its form as a trekking staff 100 with an arrow pointing to its form as a tripod 102. The trekking staff 100 is a generally elongate, rod-like member that includes a main shaft 108 with a handle device 104 or other gripping structure at one end and a free end that is pointed or otherwise defined to contact a ground surface. At least one or more grips 105-1 and 105-2 may be located along the elongate member and are configured to be grasped to hold the trekking staff 100. The handle device 104 is attached to the main shaft 108 by a locking structure such as the pin 128 shown.

For the tripod configuration, the pin 128 is released from the main shaft 108. The handle device 104 is removed from the top of the main shaft 108 and at least one or more concentric shafts are removed from within an interior cavity of the main shaft 108. As shown, first 110 and second concentric shafts 112 are removed and attached to a housing 116 of the main shaft 108. Stability is achieved with the main shaft 108 and shafts 110 and 112 arranged in a tripod stance. In place of the handle device 104, external components such as the holder 126 and camera 114 may be attached to the main shaft 108. A hiker thus uses the trekking staff 100 as a support during hiking, and may also use the trekking staff 100 as a tripod 102 to mount various devices.

Figure 2:
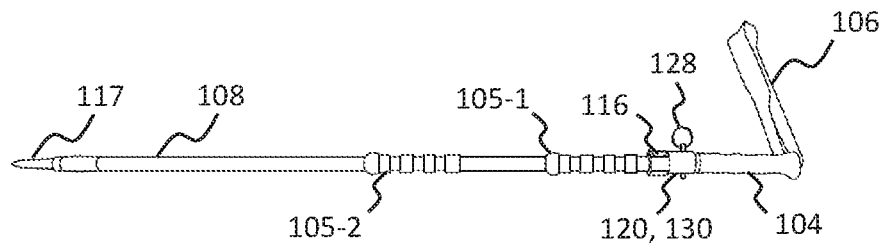
FIG. 2 illustrates a convertible trekking staff according to an example of the principles described herein.
Figure 3:
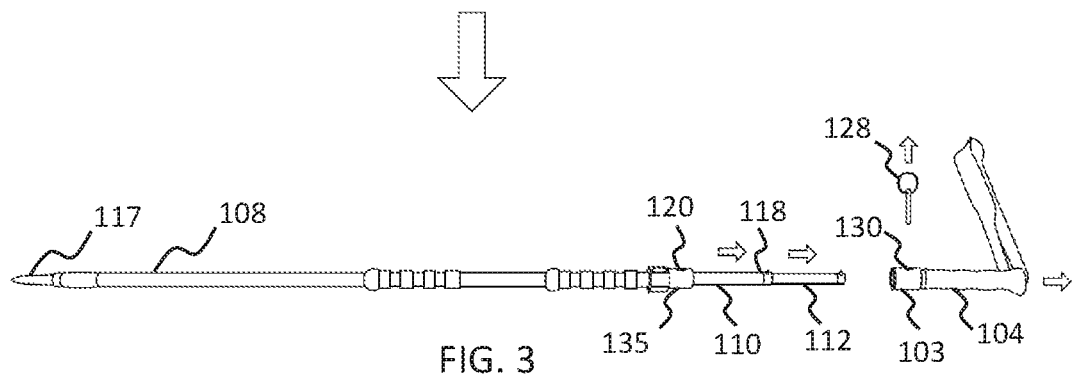
FIG. 3 illustrates an exploded view of a convertible trekking staff according to an example of the principles described herein.
Figure 4:
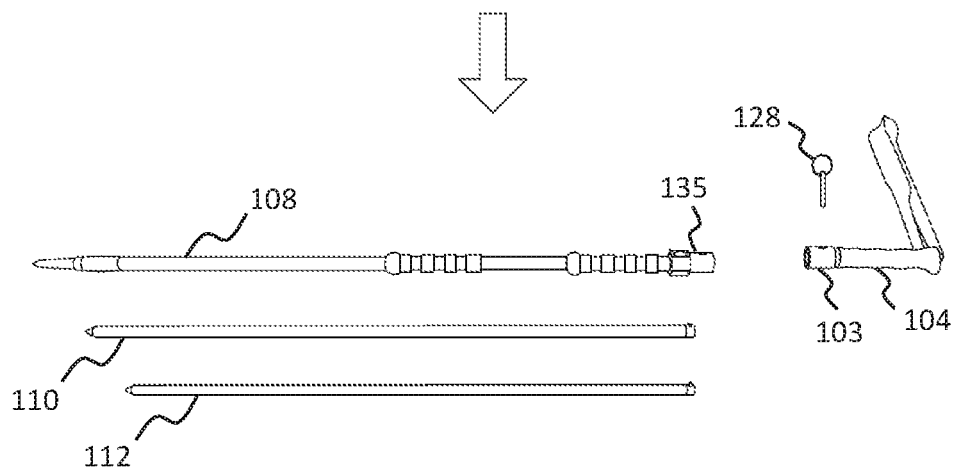
FIG. 4 illustrates an exploded view of a convertible trekking staff according to an example of the principles described herein.

Turning to FIGS. 2, 3 and 4, the trekking staff 100 is shown in various stages. FIG. 2 shows the trekking staff 100 in its trekking staff configuration. In this configuration, the main shaft 108 contains shafts 110 and 112 within an interior cavity 135. The interior cavity 135 may go partway or completely through the interior body of the main shaft 108. The interior cavity 135 has at least a depth that allows for a substantial length, or the complete length, of the first 110 and second shafts 112.

The first shaft 110 also has an interior cavity 118 for receiving the second shaft 112. The interior cavity 118 may go partway or completely through the interior body of the first shaft 110. The interior cavity 118 has at least a depth that allows for a substantial length, or the complete length, of the second shaft 112.

A handle device 104 is removably coupled to the main shaft 108 over the interior cavity 135. The handle device 104 is fixed to the main shaft 108 by a locking structure. The handle device 104 may further include a wrist lanyard 106, or other type of strap for a user to wear around a wrist and help secure the trekking staff 100 to the user should the user lose a grasp of the handle device 104.

FIG. 2 shows the handle device 104 coupled to the main shaft 108 by a pin 128 that is inserted through holes 120 and 130. Holes 120 go through the walls of the main shaft 108 and are diametrically opposed. Holes 130 go through a handle insert 103 of handle device 104 and are diametrically opposed. Alignment of the holes 120 and 130 allows the pin 128 to be inserted therethrough. The holes 120 and 130 are configured to align when the handle insert 103 is properly inserted within the interior cavity 135. The pin 128 may have a friction fit through the holes 120 and 130 to prevent the handle device 104 from coming out of the main shaft 108. The pin 128 may also be secured by a locking structure, such as a clasp, snap, or other locking structure. Instead of a friction fit, the locking structure may have a threaded screw fit or other type of joinder. Instead of two holes 120 and 130, there may be only one hole through handle insert 103 and main shaft 108 such that the pin 128 does not extend completely therethrough.

While locking structure that secures the handle device 104 to the main shaft 108 may include the pin 128 shown in FIG. 2, other types of locking structure may be implemented. In place of the pin 128 or in addition to, the handle insert 103 may have a threaded screw that interacts with corresponding threads of the interior cavity 135. In one example, the locking structure includes an adhesive that secures the handle device 104 to the main shaft 108. A slip fit male or female adapter, magnetic fixation, or a twist cam lock may also be used. The connection may instead include a spring-loaded locking pin. A spring lock may be integrated in the handle device 104. At least one of an internal or external lock may be incorporated in at least one of the interior cavity 135 or housing 116. Other types of locking structures may be used, such as at least one fastener, snap, clasp, clamp, tie, coupling, or other locking structure. Multiples of one type of locking structure or a combination of various types of locking structures may also be used.

The housing 116 may include at least one or more of the locking structures described above. If the housing 116, instead of the main shaft 108, contains the holes, alignment of the holes in the housing 116 and the handle insert 103 are required for the pin 128 to go through. While in one particular example the first 110 and second concentric shafts 112 may be fully contained within the main shaft 108 when they are inserted within the main shaft 108, in other examples the upper portions of the first 110 and second concentric shafts 112 are contained in the housing 116 when they are inserted within the main shaft 108.

FIG. 3 depicts the first 110 and second concentric shafts 112 partially released from the interior cavity 135 of the main shaft 108. The pin 128 is separated from the main shaft 108 after being slidably removed or otherwise disengaged from the main shaft 108 and handle insert 103. The handle device 104 is also separated from the main shaft 108 after being slidably removed or otherwise disengaged. Each shaft 110 and 112 includes an elongate rod-like element, the second shaft 112 being slightly smaller in diameter so that it can be slidably inserted within the interior cavity 118, a hollow or generally elongate cylindrical interior, of the first shaft 110. As shown, second shaft 112 is shown with an arrow pointing away from the first shaft 110 to indicate its removal from within the interior cavity 118 of the first shaft 110. The first shaft 110 is shown with an arrow pointing away from the main shaft 108 to indicate its removal from within the interior cavity 135 of the main shaft 108.

Grips 105-1 and 105-2 may be located at any location along the axial length of the main shaft 108. Grips 105-1 and 105-2 may include a material (e.g. rubber, foam, cork, plastic, a combination thereof, etc.) that provides cushion, hardness, texture (e.g., pebble surface, graininess, roughness, etc.), ergonomic design, or other feature that allows a user to wrap a hand around the main shaft 108 while preventing the hand from slipping off the main shaft 108. The handle device 104 itself may have a grip around it to help the user maintain a firm grip without slippage.

At the opposite end of the main shaft 108 is a tip 117 where the pole contacts the ground and has a pointed end. The tip 117 may include the same material as the trekking staff 100 or the grips 105-1 and 105-2, or may be formed of another material. The tip 117 shown is located at the free end of the main shaft 108 and is pointed distally away from and coaxially with the main shaft 108. The tip 117 is configured to provide stable entrenchment within the ground.

Turning to FIG. 4, the main shaft 108 is shown next to the first shaft 10 and the second shaft 112 with the pin 128 and handle device 104 removed. The second shaft 112 is shorter in length than the first shaft 110. The second shaft 112 may be hollow or solid. If a third shaft were to be included, the second shaft 112 would also include an interior cavity like the interior cavity 118 of the first shaft 110 in order to receive the third shaft. Each shaft 110 and 112 includes a pointed free end to be used to contact or dig into the ground and provide a stable footing when in the tripod configuration.

Figure 5:
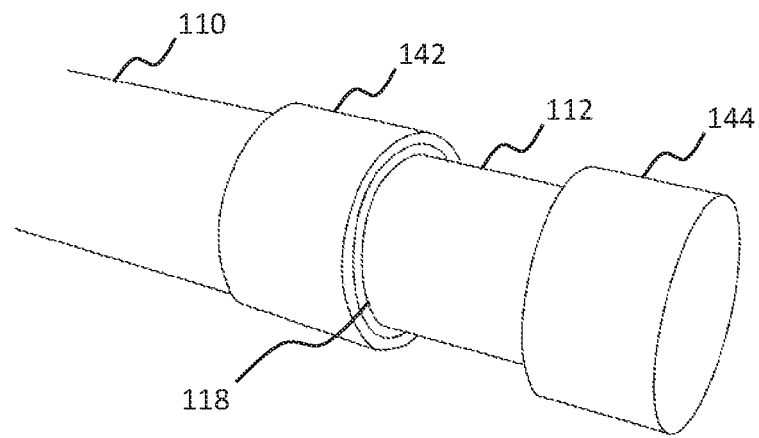
FIG. 5 illustrates a second concentric shaft inserted within a first concentric shaft according to an example of the principles described herein.

Turning to FIG. 5, the second shaft 112 is shown substantially inserted within the interior cavity 118 of the first shaft 110. The second shaft 112 includes a second end stop 144 on a free end. The second end stop 144 may be an end cap, annular covering, or housing-like fitting that extends radially outward from the second shaft 112. The first shaft 110 includes a first end stop 142 on a free end which includes an annular housing-like fitting that does not cover the top of the first shaft 110 like the second end stop 144 covers the second shaft 112. The first end stop 142 is collar-like with a hollow or lumen therethrough and an opening that provides access to the interior cavity 118 of the first shaft 110 in which the second shaft 112 is to be received. The respective outer diameters of the first end stop 142 and the second end stop 144 may be the same or different. The first end stop 142 stops the second end stop 144 at a fixed distance within the first shaft 110 as the second shaft 112 is slidably received within the interior cavity 118 of the first shaft 110 and thus prevents further longitudinal movement of the second shaft 112 within the first shaft 110. Once stopped, the first end stop 142 is in contact with the second end stop 144.

In one example, the first end stop 142 is dimensioned to receive and partially or fully contain the second end stop 144 inside the collar-like opening of first end stop 142. The fit of the first end stop 142 within the opening of the second end stop 144 may be a friction fit, screw fit, or other type of fit.

In one example, the second end stop 144 is similar to the first end stop 142 such that the second end stop 144 has a collar-like fitting that does not cover the top of the second shaft 112. The second stop 144 may have an opening or lumen therethrough like the first end stop 142. The first end stop 142 may stop the second end stop 144 at a fixed distance due to the contact of outer collars of the first 142 and second end stops 144. A lumen opening of the second end stop 144 may provide use of the space within the second end stop 144, whether it be for storage of items or to attach to a shaft extension. The fit between the first shaft 110 and second shaft 112 may be a friction fit such that there is little to no jostling or movement of the second shaft 112 within the first shaft 110.

The fit of the first shaft 110 within the interior cavity 135 of the main shaft 108 may also be a friction fit. Particularly, the stops 142 and 144 having a wider diameter than the shafts 110 and 112 may result in a friction fit of the stops 142 and 144 with the interior surface of the interior cavity 135 of the main shaft 108. Such a friction fit prevents jostling or movement of the shafts 110 and 112 within the main shaft 108. In some examples, the first 110 and second shafts 112 may have little or no contact with interior walls of the main shaft 108 because they are suspended by the friction fit of the first 142 and second stops 144 contacting the interior walls of the main shaft 108. In one example, the shafts 110 and 112 contact the interior walls of the main shaft with a friction fit as well.

In some examples, there may be one end stop on one of the shafts or no end stops at all. For example, there may be an end stop on just the second shaft 12 that is used to prevent longitudinal movement when the second end stop 144 contacts a free end of the first shaft 110. In another example, the second shaft 112 has a longer length such that it cannot be fully inserted within the first shaft 110. The free end of the second shaft 112 sticks out so that no end stop is required.

Figure 6:
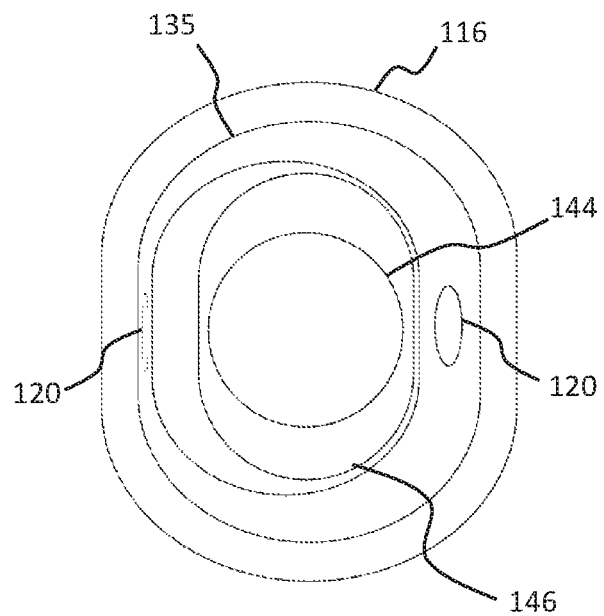
FIG. 6 illustrates a top view of an interior cavity of a main shaft according to an example of the principles described herein.

FIG. 6 illustrates a top view of the interior cavity 135 of the main shaft 108 with the first 110 and second 112 shafts inserted. In FIG. 6, just the second end stop 144 of the second shaft 112 is visible within the interior cavity 135 since it is the last shaft to be inserted within the main shaft 108 and because the second end stop 144 rests on top of the first end stop 142 and because the first 142 and second end stops 144 have the same diameter. The interior cavity 135 is defined by the space in the main shaft 108 that holds the first 110 and second shaft 112 as well as the space for the handle insert 103 and pin 128 to be received. The holes 120 go through the walls of the main shaft 108 and are located at a height that is above the second end stop 144.

While the opening of the interior cavity 135 is shown as being coaxial with the longitudinal axis of the main shaft 108, the opening may be at an angle in other examples. Also, the opening may be offset from the longitudinal axis.

With the handle device 104 separated from the interior cavity 135, an interface is exposed to receive an external component. The interface shown includes an inner shoulder 146 around the interior cavity 135. The inner shoulder 146 is defined by an inner wall, ridge, or flange that extends radially inward from walls of the interior cavity 135. The inner shoulder 146 stops the handle insert 103 at a fixed distance as the handle device 104 is inserted within the main shaft 108. Space below the inner shoulder 146 and above the second end stop 114 may be dimensioned to hold items such as external components, devices, lip balm, food items, camera equipment, head phones, or other items for hiking or other activities.

In one example, the interface may be a ridge or indention or other type of interface. The interface may include at least one screw thread, hook and loop connector, snap lock, tie, cam lock, clamp, or other type of locking feature. In other examples there is no inner shoulder 146. In this case, the base of the handle insert 103 is directly above or in contact or nearly in contact with second end stop 144.

The cross section of the interior cavity 135 may be congruous along the full length of the main shaft 108. Alternatively, the cross section of the portion of the interior cavity 135 that contains the concentric shafts may be circular or have another shape while the interior cavity 135 near the top of the main shaft 108 may have a cross-section that is rectangular with slightly rounded corners, as shown. Other shapes may include oval, oblong, square, or other shapes. The interior cavity 135 and the handle device 104 or handle insert 103 may have at least one corresponding corner that prevents axial rotation when the handle device 104 is inserted within the interior cavity 135. Furthermore, dimensions such as height, width, depth, etc. may be the same.

The rectangular shape as shown aids in aligning holes 120 of the interior cavity 135 with corresponding holes 130 of the handle insert 103. Corners of the rectangular shape align with corners of the handle insert 103 and thus prevent rotation of the handle insert 103 within the interior cavity 135.

Figure 7:
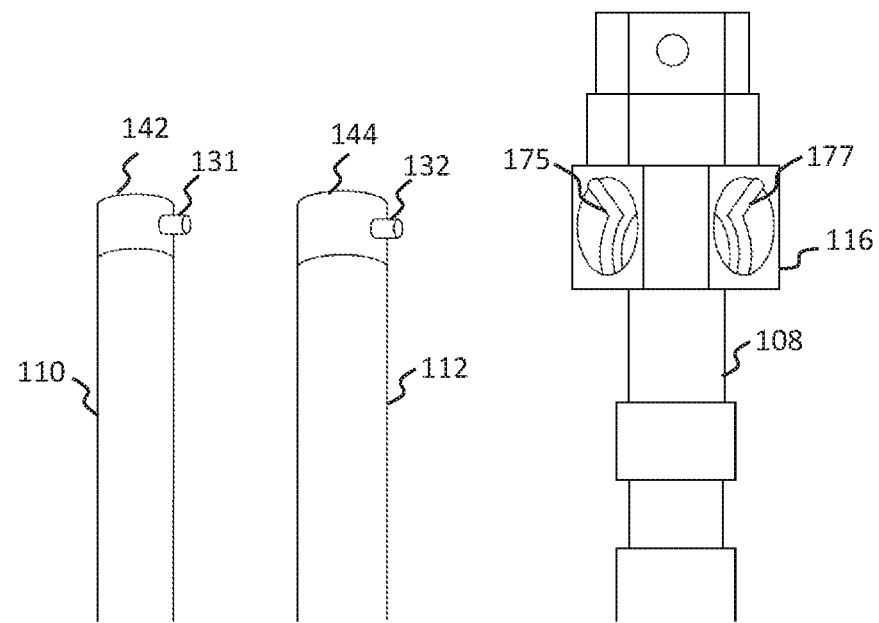
FIG. 7 illustrates cam locking features of a first and second concentric shaft and main shaft according to an example of the principles described herein.

An example housing 116 is shown located at or near a top of the main shaft 108 and adjacent to the handle device 104 in FIG. 7. The housing 116 includes a collar or covering that wraps circumferentially around the main shaft 108. The housing 116 may fully encircle, partially encircle, or otherwise be situated around the outer surface of the main shaft 108. The housing 116 may be a separate independent component that is attached to the top of the main shaft 108 or may be integral to the main shaft 108 as one piece.

In some examples, the housing 116 provides an interior cavity for the handle insert 103 and the external components instead of the main shaft 108. Upon removal of the handle insert 103, the interface is exposed and is located within the housing 116. The housing 116 may be coaxial with the main shaft 108 or be angled. Items may be stored within the housing 116 and attached to the housing 116 and interface. The interior of the housing 116 may have different dimensions than the interior cavity 135 of the main shaft 108. For example, the main shaft 108 may have an interior cavity 135 that mimics the dimensions of the first 110 and second shafts 112 with a cylindrical body or a conical body with tapering sides. The housing 116, on the other hand, may be more box-like with an interior having a rectangular cross-sectional area. At least one of the main shaft 108 and housing 116 may have cross-sectional areas that vary over respective lengths.

Engagement structures are provided for engaging shafts 110 and 112 to housing 116. FIG. 7 illustrates first 110 and second shafts 112 having engagement structures in the form of a cam lock. The structures include locking arms 131 and 132 which are elongate members or keys that extend radially outward from respective shafts 110 and 112. The arms 131 and 132 may extend directly from the shafts 10 and 112 or they may extend from respective first and second end stops 142 and 144 as shown.

Figure 8:
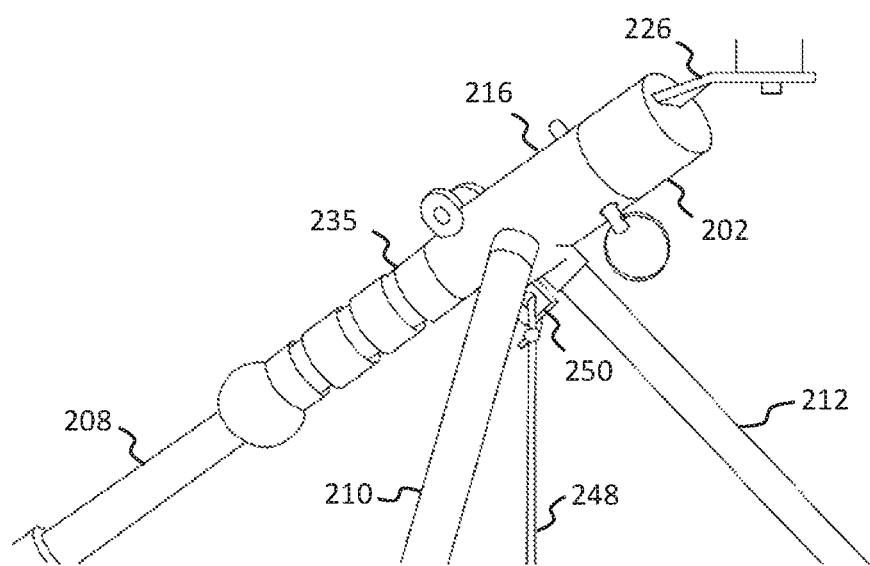
FIG. 8 illustrates a tether on a tripod configuration according to an example of the principles described herein.

The housing 116 includes a corresponding engagement structure for a cam lock in the form of two receiver holes 175 and 177 in which the first and second shafts 110 and 112 are inserted. Each receiver hole 175 and 177 has a cam opening or cavity in which the respective locking arms 131 and 132 may be slidably inserted and rotated to lock with a tight or friction fit. The receiver holes 175 and 177 are at a same height with respect to the housing 116. Locked shafts 110 and 112 within the receiver holes 175 and 177 cause the shafts 110 and 112 to have a relative angle between each other of 25-35 degrees, 35-45 degrees, 45-55 degrees, 55-65 degrees, 65-75 degrees, or 75-80 degrees. The relative angle between the main shaft 108 and each of the shafts 110 and 112 may be of the same or similar ranges. The angle shown between the two shafts 110 and 112 in FIG. 8 is approximately 60 degrees. The angle shown between the main shaft 108 and each shaft 110 and 112 is also approximately 60 degrees. The receiver holes 175 and 177 are recessed at an angle such that they fan downward from the main shaft 108 to form a tripod stance. Variations include that the receiver holes 175 and 177 be recessed perpendicular to the housing 116.

In some examples, the first 110 and second shafts 112 are positioned or angled closer relative to each other than the main shaft 108. The angled shafts in the tripod configuration substantially lower the center of mass towards the ground which reduces the likelihood of tipping and creates stability in which mobile devices, cameras, tablets, speakers, radios, or other electronic device and the like may be supported.

Removal of the shafts 110 and 112 from the housing 116 is accomplished by rotating the shafts 110 and 112 in reverse of the initial rotation and thereby unlocking the cam lock to release the shafts from respective receiver holes 175 and 177.

While particular reference is made to a cam lock, other types of locking features may be used. Examples include a snap lock, friction fit, screw fit, and a twist lock. In some examples, the receiver holes 175 and 177 are located directly on the main shaft 108 and the shafts 110 and 112 are inserted and attached therein.

FIG. 8 depicts a tripod formation by shafts 208, 210, and 212. In addition to the previous tripod discussed, the tripod 202 shown includes a tether attachment 250 that includes an attachment structure for attaching a tether 248. The tether attachment 250 as shown is a holed member or eyelet member that is a part of, or is attached to, the housing 216 and is centered or positioned below the apex formed by convergence of the shafts 208, 210, and 212.

The tether attachment 250 faces directly downward to the base of the tripod 202 and along the central axis of the tripod 202. This allows for directly access to a ground surface below. For example, a tether 248 attached to the tether attachment 250 does not have to wrap around shafts to be anchored to the ground. A tether 248 as shown in FIG. 8 may be attached to the tether attachment 250 and directed from the housing 216 of the pyramid-like configuration to a ground surface below. The tether 248 may be a rope, strap, cord, or other member that is used to anchor the tripod 202 to a ground surface below. There is ample space provided by the angled shafts in which the tether 248 can be freely pulled in different directions as desired. The tether attachment 250 shown includes a hole from which a tether 248 is attached.

The tether 248 can be made to be straight or made to be angled depending on a user's desire. The tether 248 provides an additional force to anchor the tripod 202 and can be particularly helpful in dealing with various types of terrain. If the tripod 202 is on a hill, for example, the tether 248 can be aimed slightly upward to counteract forces of gravity not found on level ground. For the tripod 202 on an unlevel surface, the tether 248 can be anchored at an odd angle and yet still provide stability.

In some examples, the space provided in the interior cavity 135 may be used to stow away the tether 248 and anchor when not in use. In one example, the tether attachment 250 may be attached to the main shaft 208 rather than the housing 216.

Various handle devices and external components may be used with the trekking staff 100. For example, holder 226 is attached to the main shaft 208 at or near the location where a handle device 104 could be attached as shown in FIG. 8. The handle device 104 is removable and interchangeable with other types of handle devices or holders, external components, or other devices shown in FIGS. 9a, 9b. 9c, and 9d.

Handle inserts 303a, 303b, 303c, and 303d are used to attached the handle devices and external components to the top of the housing 116 or the main shaft 108. The handle inserts 303a, 303b, 303c, and 303d are elongate members that extend coaxially downward from free ends of the handle devices and are dimensioned to slidably fit within the interior cavity 135 of the main shaft 108 or housing. The handle inserts 303a, 303b, 303c, and 303d have smaller outer widths and diameters than the handle devices to which they will be inserted. Thus, the outer edges of the handle devices provide a rest which stops the handle devices themselves being inserted within main shaft 108. Handle inserts 303a, 303b, 303c, and 303d may include locking structure, such as holes or other structure described above, to attach to the main shaft 108 or housing 116. Handle inserts 303a. 303b, 303c, and 303d allow the avid hiker to exchange a variety of handle devices to suit a variety of terrains.

Figures 9A, 9B, 9C, 9D:
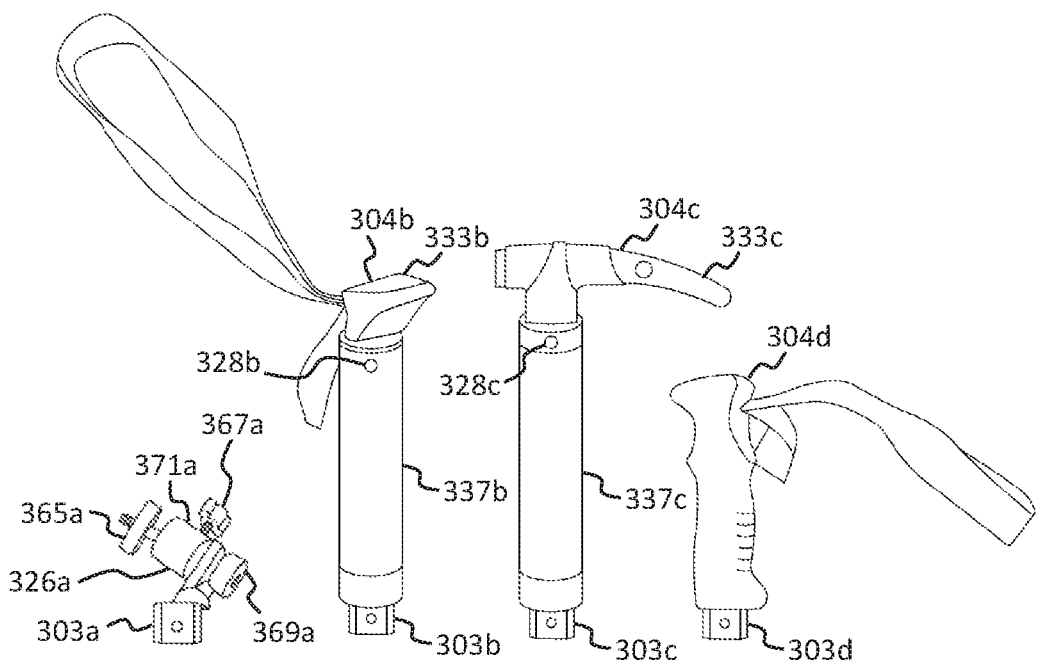
FIG. 9a illustrates a removable holder according to an example of the principles described herein.
FIG. 9b illustrates a removable handle device according to an example of the principles described herein.
FIG. 9c illustrates a removable handle device according to an example of the principles described herein.
FIG. 9d illustrates a removable handle device according to an example of the principles described herein.

FIG. 9a shows an external component in the form of a holder 326a that can be attached to a main shaft or housing. FIGS. 9b, 9c, and 9d show various handle devices that can be attached. The holder 326a includes a screw fit 365a, locking fit 367a, and endpiece 369a attached to a body 371a. The screw fit 365a includes a screw or other attachment to attach a camera or other device to the body 371a. The locking fit 367a is a screw that is used to orient or otherwise tighten the screw fit 365a or body 371a and camera to a desired angle or position. The endpiece 369a is a base used to stand a camera on its own or provide a rest. Other types of holders are anticipated.

FIG. 9b shows a handle device 304b with a small removable top 333b. FIG. 9c shows a handle device 304c with an elongate removable top 333c. Instead of being bent like 333c or angled like top 333b, the top may be a handle that is coaxially aligned with the main shaft 108 like top 304d in FIG. 9d. Top inserts 303b and 303c of the handle devices 304b may be attached to the main shaft 108 with pins or other locking structures as described herein.

Figures 10A, 10B:
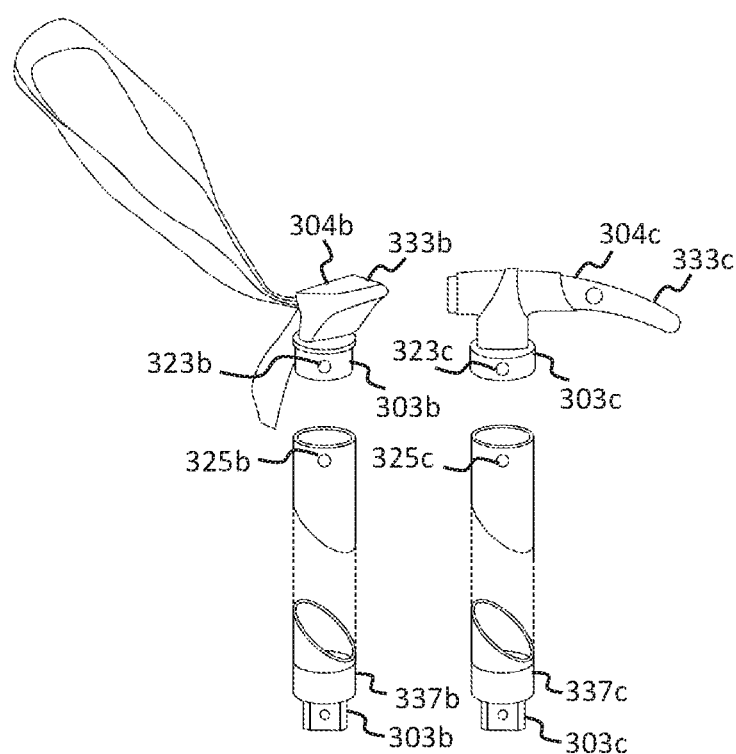
FIG. 10a illustrates an exploded view of a removable handle device according to an example of the principles described herein.
FIG. 10b illustrates an exploded view of a removable handle device according to an example of the principles described herein.
Figure 11:
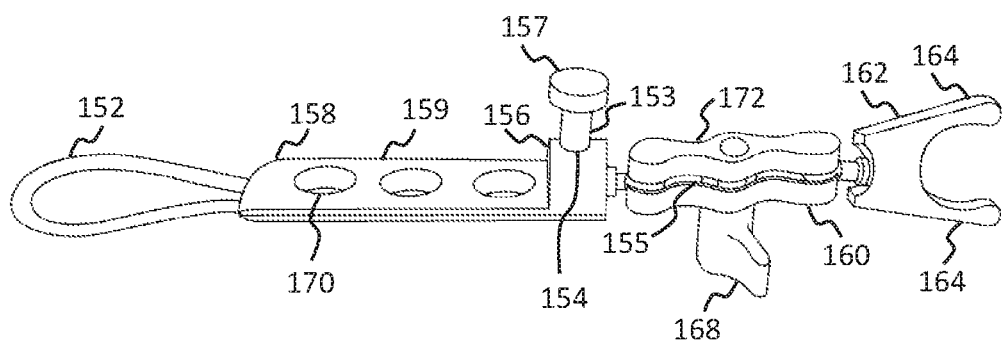
FIG. 11 illustrates an external component for a convertible trekking staff according to an example of the principles described herein.

The handle devices themselves may provide added storage for transporting and safekeeping items. FIGS. 10a and 10b show exploded views of the handle devices 304b and 304c which allow for storage. Tops 333b and 333c of handle devices 304b and 304c are removable from respective handle bodies 337b and 337c. Within the handle bodies 337b and 337c are handle cavities as indicated by dotted lines. Various items discussed herein as well as other items pertaining to hiking or other activities may be stored therein. Tops 333b and 333c of handle devices 304b and 304c may be attached to handle bodies 337b and 337c by pins 328b and 328c (see FIGS. 9b and 9c) that go through holes 325b and 325c of respective bodies 337b and 337c and holes 323b and 323c of respective tops 333b and 333c. The holes 325b, 325c are aligned with holes 323b, 323c for the pins 328b and 328c to go through and be held with a friction fit. Instead of two holes diametrically opposed on both the tops and bodies, there may be a single hole on both the tops and bodies for a pin to be secured. Other types of securement may include at least one screw thread, hook and loop, snap lock, tie, cam lock, clamp, or other type of locking feature External components such as holders may be attached not only on top of the main shaft 108, but also to sides of the main shaft 108 or to the first 110 and second shaft 112. Turning to FIG. 11, an external component includes an adapter 158 that may be affixed along a side of the main shaft 108. The adapter 158 includes a dual lock 172 which is an oblong, round, or elongate body with two opposite ends. One end is attached to a back support 159 and the opposing end is attached to a clamp 162. The back support 159 is a support or other type of securement for supporting an external device. An attachment structure is used to secure the external device to the back support 159 so that it does not slip off the back support 159. The clamp 162 on the other end of the dual lock 172 is used to attach the adapter 158 and one or more external devices to the main shaft 108.

The back support 159 can be any kind of attachment that can be secured to a mobile device, camera, tablet, speaker, radio, or other electronic device. The back support 159 as shown has a body with a flat surface upon which items may rest against. The body may be a substantially flat, elongate member that is rectangular, circular, or oval shape. Instead of being flat, the surface of the body of the back support 159 may have a concave or cupping shape. To rest a device against the surface, a shelf 156 may extend from the back support 159. The shelf 156 may include a flat surface, ridge, or any kind of rest upon which the device can rest with a back of the device against the flat surface and a bottom surface of the device resting on the shelf 156. The shelf 156 may be perpendicular to or at an angle with the flat surface of the back support 159. Also, the shelf 156 may have a divet, curvature, or have other distinguishing features that help maintain an external device in position. Furthermore, the shelf 156 may have an overlay of material, such as rubber, silicone, plastic, or other material that provides friction with the bottom surface of the device. The surface further may include texture, pebbling, or other type of feature that provides friction with a device. The back support 159 may also include at least one of these features to provide friction with the device and thus prevent movement of the device.

The back support 159 includes attachment structure to secure a device to the back support 159. For instance, the base of the back support 159 may include a hook 154 or elongate member as shown that extends outward from the flat surface of the back support 159. A loop 152 on the opposite end of the back support 159 wraps over the device and is wrapped around the hook 154 for securement. The loop 152 may have resilient properties that allow it to stretch over the device. The hook 154 extends outward from the shelf 156 or below the shelf 156. The hook 154 shown includes a neck 153 and a knob 157. The neck 153 is an extended elongate member from the shelf 156. The knob 157 is positioned at the free end of the neck 153 and includes an annular ridge or rounded member or other extension that has a larger diameter or width than the diameter or width of the neck 153. The knob 157 prevents the loop 152 from slipping off the relatively narrower neck 153.

Other types of attachment structure may be used in place of a hook 154. For example, at least one of a hook and loop material, strap, tie, or snap may instead be used. Also, separate independent attachment structures not attached to the adapter 158 may be used and may include at least one of a hook and loop material, magnet, strap, tie, snap, or loop, or other locking structure discussed herein.

Holes 170 spaced at different locations on the back support 159 lighten the overall weight of the adapter 158.

The clamp 162 on the opposite end of the dual lock 172 includes two or more curved arms 164 that extend initially apart from each other and then converge toward each other to an opening between their ends. The arms 164 are elastically resilient so that ends of the arms 164 can be forced open to surround the main shaft 108. The arms 164 elastically return to hold on to or clasp around the main shaft 108 and hold the dual lock 172 and back support 159 firmly in place.

The back support 159 and clamp 162 are connected to the dual lock 172 through two ball bearing attachments 155 on opposing ends of the adapter 158. The ball bearing attachments 155 include ball joints and bearings that pivot and rotate to allow rotational movement of the back support 159 and clamp 162 with respect to the dual lock 172. Walls of the dual lock 172 that surround the ball joints and bearings are tightened around the ball joints and bearings by a twist lock 168, or other locking structure, to fixate the ball joints and bearings and thus the back support 159 and clamp 162, to a desired position. The ball bearing attachments 155 allow the back support 159 and clamp 162 to be oriented as desired and are simultaneously tightened into place by the twist lock 168.

The ball bearing attachments 155 of the dual lock 172 that connect to the back support 159 allow the back support 159 to pivot around its base at various angles for positioning a device relative to the tripod. The clamp 162 on the other end of the dual lock 172 provides another dimension of rotation for the back support 159. The combination of the ball joints and bearings 155 allow the back support 159 to have both angular and translational movement in three dimensions relative to the main shaft 108, thus providing a great amount of flexibility for positioning and angling cameras or other devices.

Figure 12:
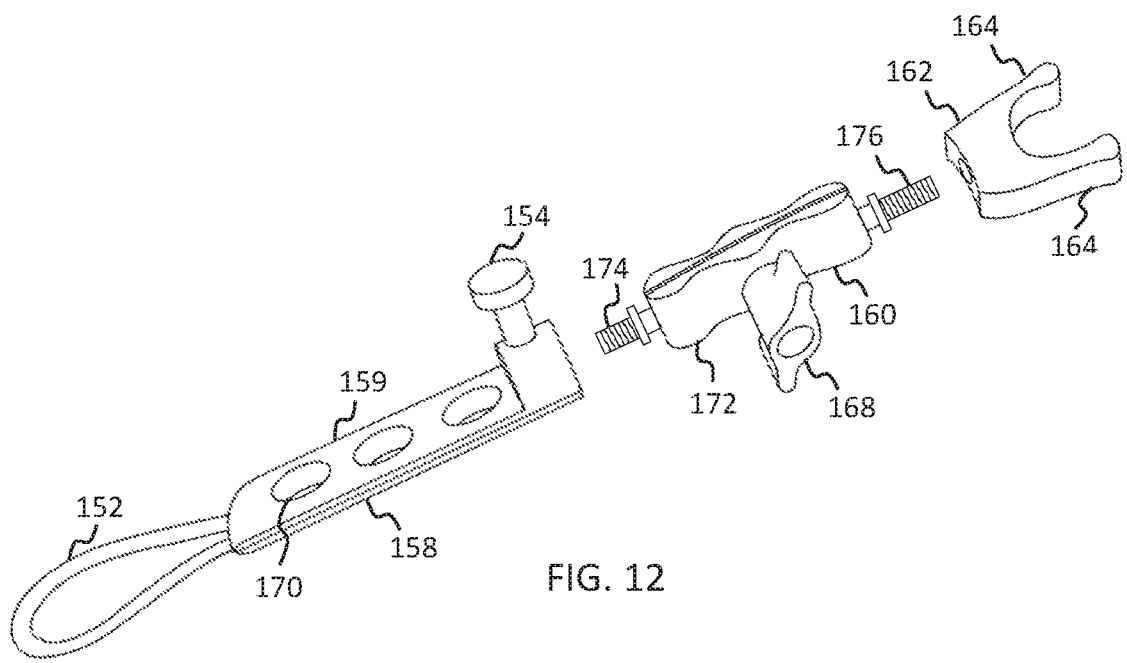
FIG. 12 illustrates an exploded view of an external component for a convertible trekking staff according to an example of the principles described herein.

FIG. 12 illustrates an exploded view of the adapter 158 with the back support 159 and clamp 162 separated from the dual lock 172. First and second screws 174 and 176 are attached to respective ball bearing attachments 155 on ends of the dual lock 172 and allow removal and interchangeability with various components. For example, back supports 159 can be exchanged depending on the type of device being used at a given time. This allows various back supports of different sizes to be used to support devices of different sizes.

In one example, the adapter 158 attaches to the top of the main shaft 108 in place of a handle device or holder. For example, an insert may be attached to one of the ball bearing attachments 155 on either end of the dual lock 172 in place of the back support 159 or clamp 162. In addition, the adapter 158 may include an insert or other component that allows it to be attached to the main shaft 108. The attachment of the adapter 158 to the top of the main shaft 108 is advantageous in providing a great deal of flexibility in positioning and orienting a camera or other device.

In some examples, various components of the adapter 158 be stored within cavities and spaces of a main shaft 108, handles 333b and 333c, housing 116, and more. Thus, modularity of the trekking staff 100 lends itself to a whole host of possible uses for many different devices and items to make the hiking adventure an enjoyable one.

Figure 13:
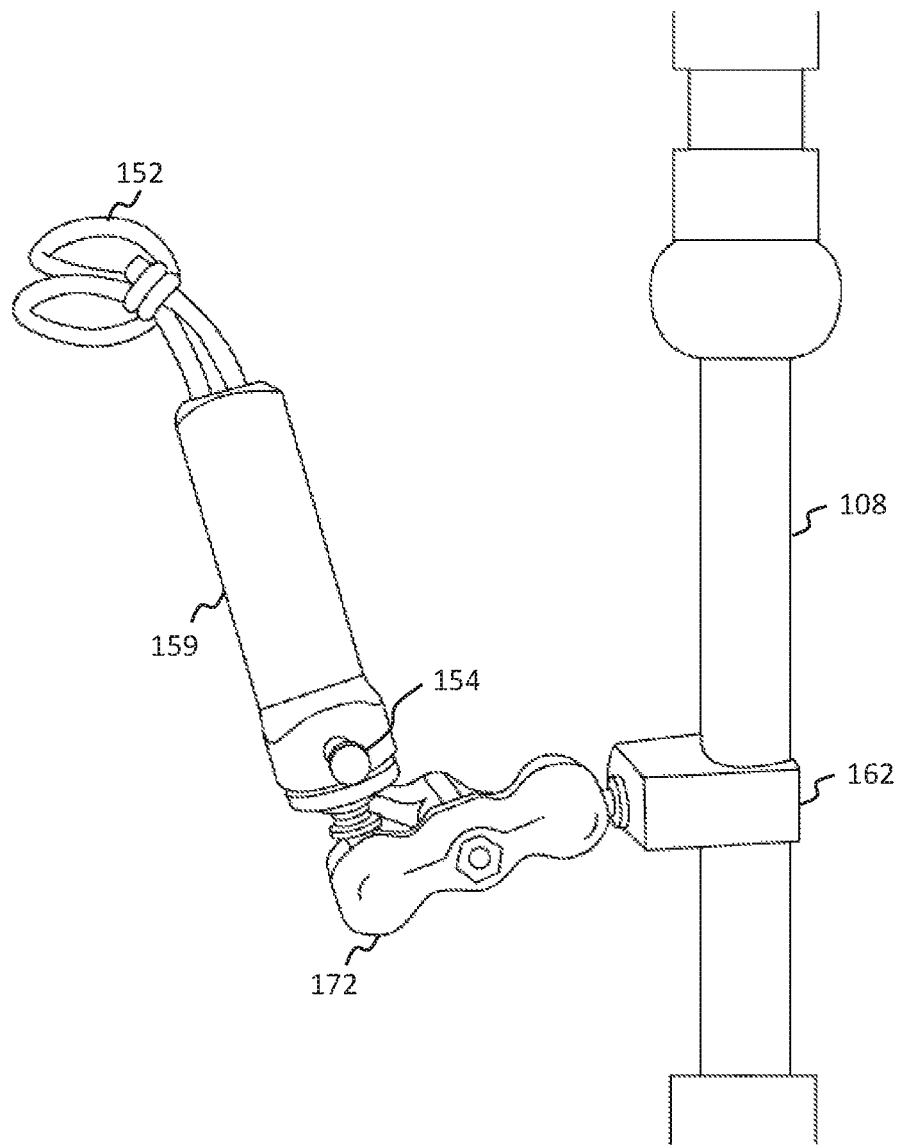
FIG. 13 illustrates an external component attached to a convertible trekking staff according to an example of the principles described herein.

As stated previously, once the back support 159 and the clamp 162 are positioned and oriented as desired, the twist lock 168 is twisted or otherwise acted on to tighten walls that surround the ball joints and ball bearings within the dual lock 172 and restrict further movement of the back support 159 and clamp 162. Other locking structures may be used such as at least one releasable clamping device, screw, slip on device, and adhesive. An example position and orientation of the adapter 158 is shown in FIG. 13. In this example, the clamp 162 is secured to the main shaft 108, the dual lock 172 is slightly angled downward and the back support 159 is positioned perpendicular to the dual lock 172. The loop 152 is used to secure a device to the back support 159 by attaching to the hook 154.

Figure 14:
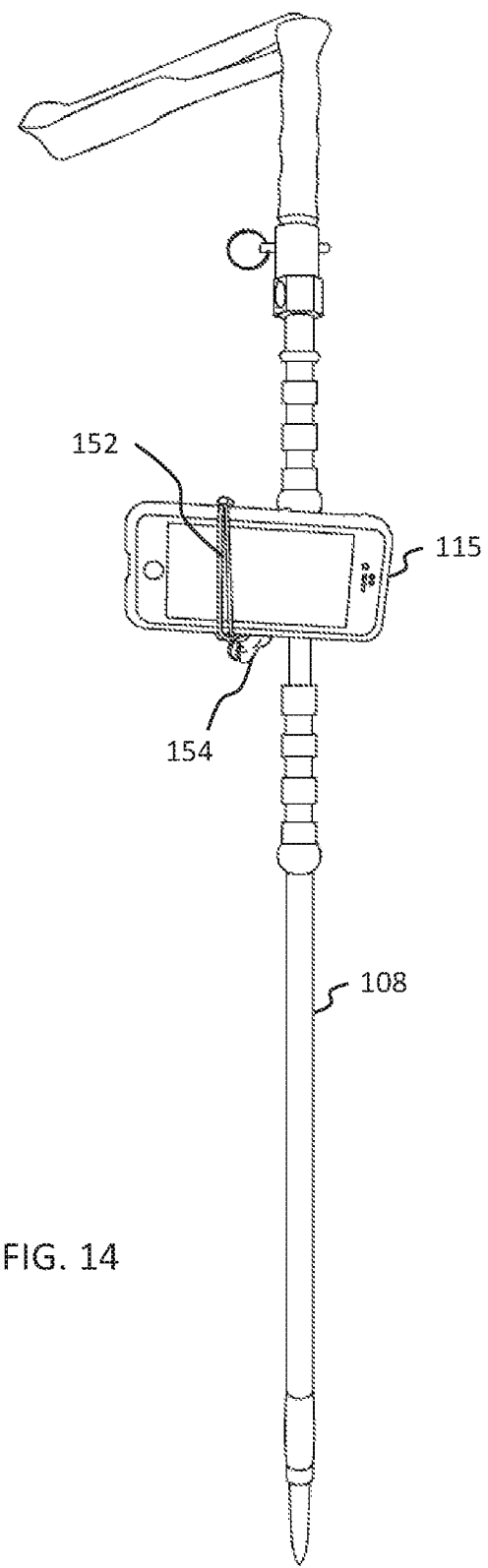
FIG. 14 illustrates an external component holding an electronic device and attached to a convertible trekking staff according to an example of the principles described herein.

A mobile device 115 is shown secured to the adapter 158 in FIG. 14. The loop 152 is wrapped around the mobile device 115 and secured to the anchor 154. In some examples, other holders, like the holder 326a shown in FIG. 9a, may be attached to the dual lock 172. In some examples, electronic devices may be screwed to the ball bearing attachments 155 by screws 174 and 176 without a back support 159 being used at all.

Figure 15:
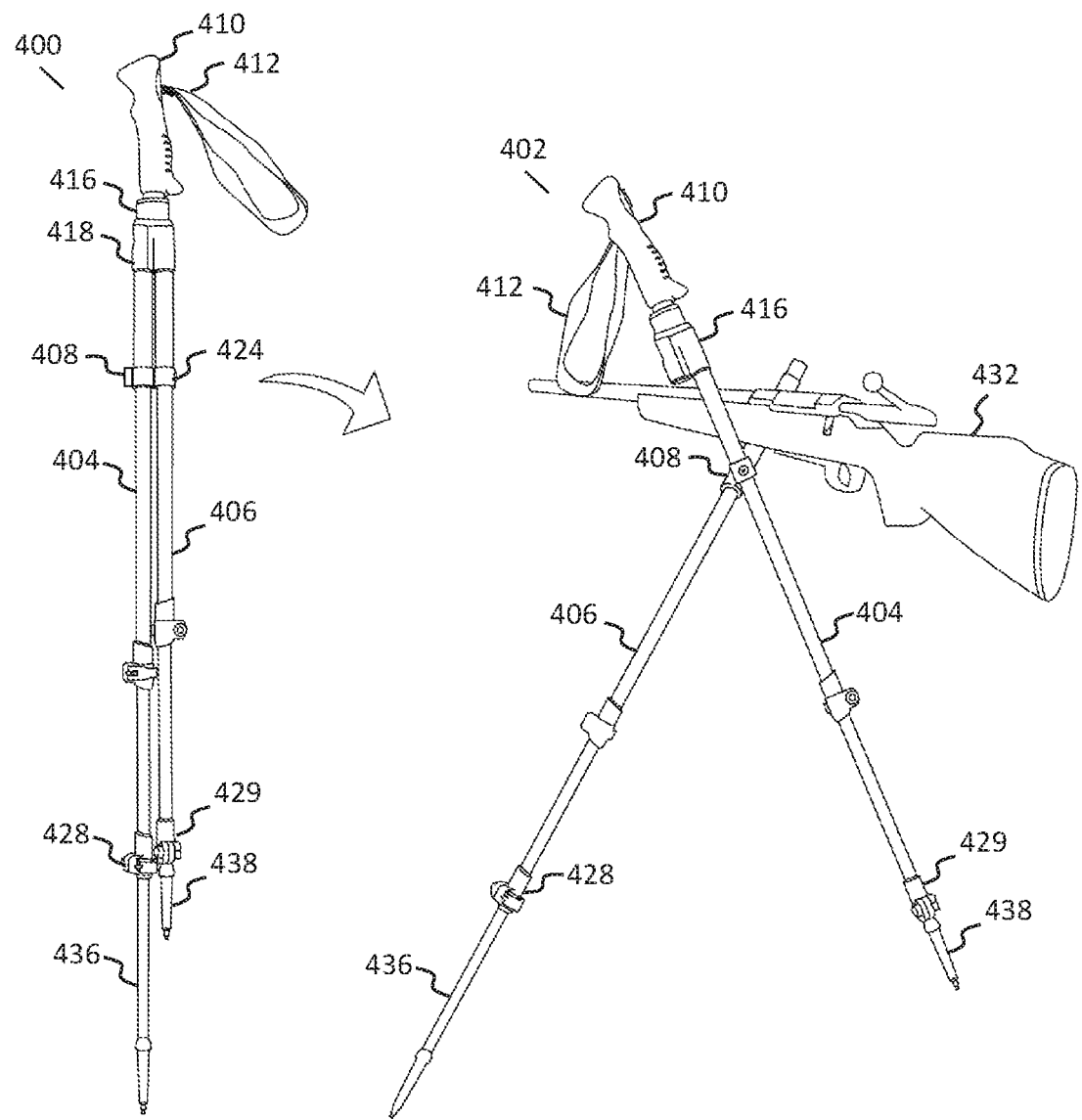
FIG. 15 illustrates a convertible trekking staff in two configurations according to an example of the principles described herein.

Instead of a concentric shaft arrangement within the main shaft 108, a second shaft may be located adjacent to the main shaft 108. Turning to FIG. 15, a trekking staff 400 is shown in its form as a trekking staff with an arrow pointing to its form as a bipod 402. The trekking staff 400 configuration includes two shafts 404 and 406 that are retained in parallel by a spring-loaded component 418. A modular handle device 410 with a lanyard 412 is attached at a top of the two shafts 404 and 406. A coupling member 408 removably retains the two shafts 404 and 406 in a position that prevents axial movement and rotation.

In the bipod configuration 402, the second shaft 406 is released by the spring-loaded component 418 from the main shaft 404 and is rotated relative to a pivot rod 424 of the coupling member 408 on the main shaft 404. A desired angular position of the main shaft 404 relative to the second shaft 406 is retained by the coupling member 408 to form a bipod 402.

The two configurations provide a variety of uses for a user. The trekking staff configuration supports a hiker walking through modest to difficult terrains. The bipod configuration 402 provides a quick makeshift stand in which a gun 432 or other instrument can be rested. The gun 432 may be quickly positioned on the bipod 402 and thus carefully aimed at game that is spotted in a forest. The few steps and relatively silent manner in which the second shaft 406 is rotated to form a bipod make the device advantageous not only for hunting but also for birdwatching, as well as other activities that stand to benefit from rapid and quiet action.

The shafts 404 and 406 may be telescopic such that they are made up of segments. For example, two or more concentric shafts may slide into each other and be held together by a variety of locking mechanisms. This allows a user to make the trekking staff 400 longer or shorter for a user's height or a given terrain. There may be an internal locking mechanism that relies on friction to stay secure, such as an expansion joint or a plastic widget that expands inside the trekking pole when the shaft is twisted, keeping the shafts at a desired length and preventing the segments from collapsing together. External locking mechanisms may also be used, such as clamps and other visible mechanisms on the exterior of the main shaft 404. Extension locks 428 and 429 as shown represent devices that are used to unlock bottom extensions 436 and 438 of respective shafts 404 and 406 to make the shafts longer or shorter as desired.

The housing 416 may be a separate independent containment above the two shafts or be an integral member of one of the shafts. Furthermore, the housing 416 may be a collar or containment that surrounds or partially surrounds the two shafts 404 and 406.

Figures 16A, 16B:
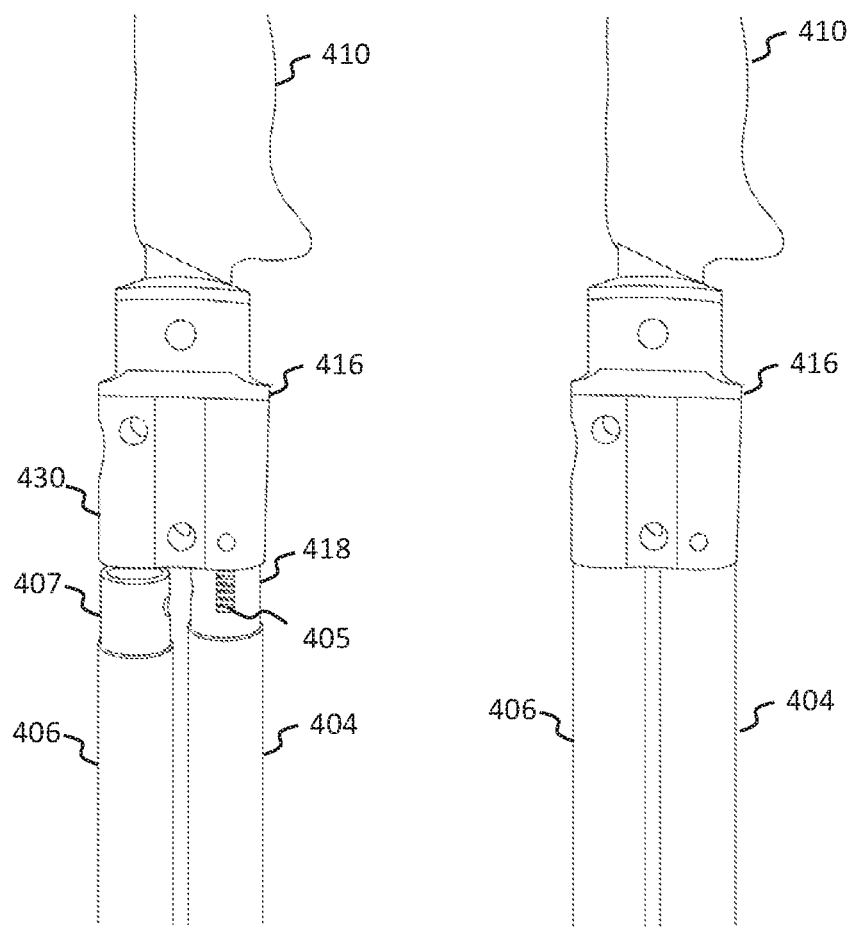
FIG. 16a illustrates a spring-loaded component used to attach a secondary shaft to a main shaft according to an example of the principles described herein.
FIG. 16b illustrates a secondary shaft attached to a main shaft according to an example of the principles described herein.

The two main connections are provided by the spring-loaded component 418 and the coupling member 408. Each will be discussed in turn. Turning to FIG. 16a, the spring-loaded component 418 shown is part of the attached main shaft 404 and includes a spring 405 that is configured to allow the main shaft 404 to be displaced a length downward from an interior cavity 430 of the housing 416 and then return to its original position relative to the housing 416. As shown, the main shaft 404 is attached by a spring 405 of the spring-loaded component 418 to the housing 416 and therefore the main shaft 404 is not completely removed from the housing 416 when the main shaft 404 is pulled away from the housing 416. Other devices with resilient properties or displacement features may be used instead of the spring 405. The connection of the shafts by the coupling member 408 makes for connected movement of the main shaft 404 with the second shaft 406. Therefore, as the main shaft 404 is lowered from the interior cavity 430, the second shaft 406 is lowered with it. The displacement allows the second shaft 406 to be removed from a space provided within the interior cavity 430 of the housing 416.

In addition to the second shaft 406 being removed from the interior cavity 430 provided within the housing 416, the coupling member 408 is loosened so that the second shaft 406 can then be pivoted around the pivot rod 424 of the coupling member 408. After a desired angle between the two shafts is achieved, the coupling member 408 is then tightened and the bipod configuration is complete.

To reconfigure the bipod 402 into the trekking staff configuration, the main shaft 404 is again displaced downward from the housing 416 with the spring 405 of the spring-loaded component 418 being stretched. Also, the coupling member 408 is loosened for the second shaft 406 to be pivoted around the coupling member 408 to a position directly underneath the housing 416. Both shafts are then re-inserted within the interior cavity 430 of the housing 416 and positioned as shown in FIG. 16*b*.

In one example, the main shaft 404 may be completely separable from the housing 416 without a spring-loaded component 418 retaining the connection of the main shaft 404 to the housing 416.

Figure 17:
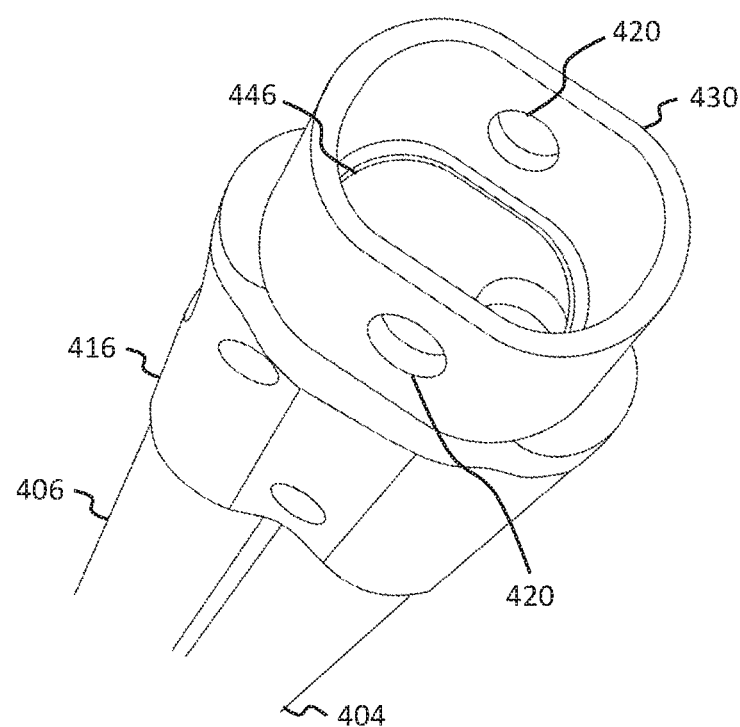
FIG. 17 illustrates a perspective view of an interior cavity of a main shaft according to an example of the principles described herein.

The handle device 410 may be removable and interchangeable with other types of handle devices, holders, devices, and other components. Turning to FIG. 17, the interior cavity 430 is shown that includes a space for a handle insert 103 to be inserted. The interior cavity 430 may include additional space to hold items for hiking as described above. The interior cavity 430 also provides an interface for external components to be received or attached to the housing 416. The interface shown includes an inner shoulder 446 that is configured to provide a rest for external components to be stopped from being received farther within the interior cavity 430. The interface may be a ridge, flange, bearing, or other type of rest or barrier. Other types of interfaces may be provided such as snaps, indentions, hook and loop, holes, and other types of interfaces.

Holes 420 are provided on walls of the interior cavity 430 for at least one pin to be inserted and thereby lock the handle device into place. Other types of locking mechanisms and structure as described herein may instead be used to lock a handle device to the housing 416 or to one or both of the shafts 404 and 406.

The interior cavity 430 as shown is rectangular with slightly rounded corners. Other shapes may include oval, oblong, square, or other shapes. The rectangular shape as shown aids in aligning holes and preventing rotation of a handle device or external component that is placed within the interior cavity 430.

Figure 18A:
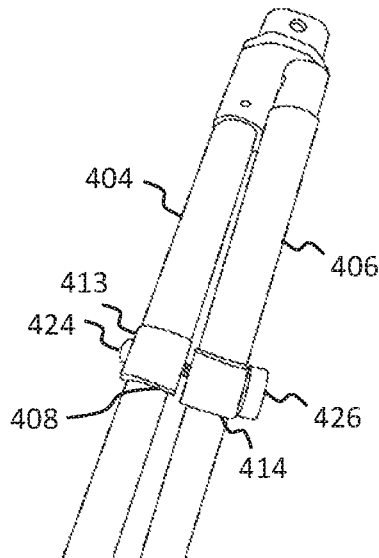
FIG. 18a illustrates a perspective view of a coupling member on the main shaft and second secondary shaft according to an example of the principles described herein.
Figure 18B:
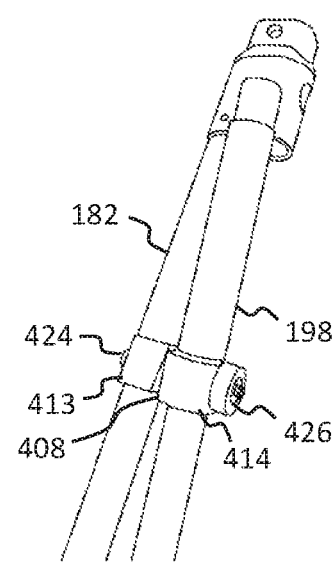
FIG. 18b illustrates a perspective view of a coupling member on the main shaft and second secondary shaft according to an example of the principles described herein.

FIG. 18*a* illustrates a coupling member 408 that is used to attach the two shafts together at a distance below the spring-loaded component 418 and housing 416. The dual points of connection, one at the top and one at a mid-section, prevent rotation and longitudinal movement and provide a stable connection to immobilize the two shafts together. The coupling member 408 may be located at any position along the length of the shafts below the spring-loaded component 418 and housing 416. The coupling member 408 includes, for example, a pivot rod 424, a locking securement 426, and collars 413 and 414 as shown. Collar 413 is a partial sleeve around the main shaft 404 while collar 414 is a partial sleeve around the second shaft 406. Each of the collars 413 and 414 include a threaded hole that further aligns with holes through the shafts. The locking securement 426 twists and tightens the pivot rod 424 which may be a screw or other member, through the aligned holes to bring the two collars 413 and 414 together in a tight manner. The tightened configuration is shown in FIG. 18*b*. While the pivot rod 424 is loosened as shown in FIG. 18*a*, the shafts 404 and 406 can pivot relative to each other about the pivot rod 424.

Other types of coupling devices may be used. For example, the coupling may include a magnetic mechanism that includes an anti-rotation device to achieve secure positioning of the shafts. In other examples, the coupling member 408 completely releases the second shaft 406 from the main shaft 404 to make the two shafts fully separable.

Figure 19A:
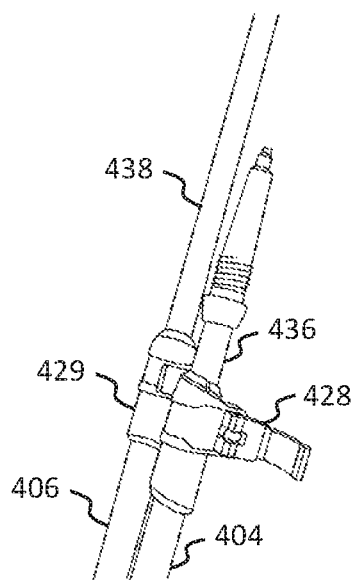
FIG. 19a illustrates a perspective view of extension locks on the main shaft and second secondary shaft according to an example of the principles described herein.
Figure 19B:
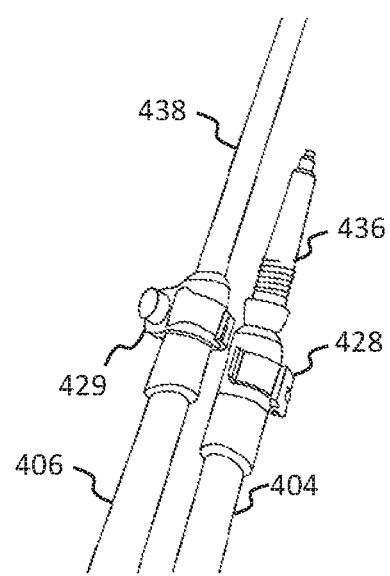
FIG. 19b illustrates a perspective view of extension locks on the main shaft and second secondary shaft according to an example of the principles described herein.

The shafts may be telescoping. For example, FIG. 19*a* illustrates extension locks 428 and 429 that release extension members 436 and 438 from respective shafts 404 and 406. Extension members 436 and 438 include shafts with smaller diameters that fit within hollows at the bottom of the shafts 404 and 406. Extension locks 428 and 429 represent devices that are used to unlock extensions 436 and 438 of respective shafts 404 and 406 to make the shafts longer or shorter as desired. The extension locks 428 and 429 may include clamps with a spring lock or another type of lock that can lock and unlock the extension members 436 and 438.

The extension members 436 and 438 allow for the lengthening of respective shafts 404 and 406. For example, with the main shaft 404 set longer in length while the second shaft 406 is set shorter in length the main shaft 404 will be the only shaft that contacts the ground while the user is hiking. In this manner, the user can use the trekking staff 400 with only one tip at the end. The different lengths may also be used to accommodate different terrains while in the bipod configuration. For example, a hilly terrain may allow one shaft to be short and placed vertically higher on the hill while the longer shaft is set a distance vertically below on the hill. This may provide a more stable stance on the hill. In another example, both shafts 404 and 406 may be the same length to benefit a person that is standing for a long time with two means of support.

The shafts, variations of the shafts, extension members, and other components described herein may be made of aluminum, carbon fiber, steel, plastic, wood, a combination thereof, or other materials. The devices described herein make a contribution to the art of hiking and tripods, for several reasons including, but not limited to, providing lightweight, simple, stable, strong, and compactible, convertible, multipurpose, convertible staffs.

The shafts being separable, concentric, telescoping, or otherwise changeable to achieve a compact size allows the overall length of the staffs to conveniently fit inside luggage or under a seat or other location where people that are travelling would want to stow the device. In some examples, the shafts of the tripod and bipod assemblies be fully released from each other to achieve a compact arrangement for transport or storage.

The weight of the current staff configurations are located largely at the top of the staff according to principles described herein, which does not encumber the length near the tip such that a user may precisely place the tip between stones, roots and other obstacles (using primarily the strength of hand and forearm). Additionally, there are no lateral supports and related components that would otherwise increase the complexity of the tripod and bipod configurations and thus, the incidence of mechanical failure, e.g., lateral supports and related components being vulnerable to being bent, broken or otherwise failing. With multiple parts and their interrelation, field repair would be difficult if not impossible.

In some examples, the trekking staff 400 may include shock absorbers that include springs or pieces of elastic material that soften the impact of the trekking staff 400 as it strikes the ground. Additionally, the trekking staff 400 may include a basket which is a circular disk or cone which prevent tips of poles from plunging too deeply into the ground and getting wedged between roots and rocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A convertible trekking staff comprising:
   a main shaft having an interior cavity;
   a handle device to be removably coupled to the main shaft over the interior cavity;
   at least two concentric shafts to be disposed within an interior cavity of the main shaft;
   a housing on the main shaft adjacent the handle device, the housing comprising an engagement structure to receive the at least two concentric shafts; and
   an interface exposed upon removal of the handle device, the interface to receive an external component,
   a first configuration in which the handle device is coupled to the main shaft and the two concentric shafts are disposed within the interior cavity to form a trekking staff, and
   a second configuration in which the external component is coupled to the main shaft in place of the handle device and the two concentric shafts are received by the engagement structure on the housing so as to form a tripod with the main shaft.

2. The convertible trekking staff in claim 1, wherein the external component may be an electronic device or a holder for an electronic device.

3. The convertible trekking staff in claim 1, wherein the handle device includes an interior cavity dimensioned to hold at least one handheld item.

4. The convertible trekking staff in claim 1, wherein the housing is located at or near a top of the main shaft and the shafts engage the housing at an angle.

5. The convertible trekking staff in claim 1, wherein the interface includes an inner shoulder within the interior cavity such that items placed inside the interior cavity rest against the inner shoulder as a stop.

6. The convertible trekking staff in claim 1, wherein the interior cavity and the handle device include at least one corresponding corner that prevents axial rotation when the handle device is inserted within the interior cavity.

7. The convertible trekking staff in claim 1, further comprising a locking structure to couple the handle device to the main shaft.

8. The convertible trekking staff in claim 1, wherein the locking structure includes at least one pin, clamp, screw, clasp, snap, slip fit male or female adapter, magnetic fixation, twist cam lock, spring-loaded locking pin, internal lock, external lock, tie, coupling, spring lock integrated in the handle device, or fastener.

9. The convertible trekking staff in claim 1, wherein the handle device and the external component are modular so as to be interchangeable with at least one of another handle device and external component.

10. The convertible trekking staff in claim 1, wherein the first configuration includes the concentric shafts to fit inside each other and within the main shaft with a friction fit that is resistant to jostling while the trekking staff is in use.

11. The convertible trekking staff in claim 1, wherein the concentric shafts include a first shaft and a second shaft, the second shaft being smaller in diameter so that the second shaft can be slidably inserted within an interior cavity of the first shaft, a top of the first shaft stopping a top of the second shaft when the second shaft is inserted in the interior cavity of the first shaft.

12. The convertible trekking staff in claim 1, wherein the second configuration includes the concentric shafts being positioned closer together than the main shaft.

13. The convertible trekking staff in claim 1, wherein at least one of a cam lock, snap lock, friction fit, screw fit, twist lock, or spring lock is used to lock free ends of respective shafts to the main shaft.

14. The convertible trekking staff in claim 1, wherein the engagement structure includes a receiver hole that is angled relative to a central axis of the main shaft.

15. A convertible trekking staff comprising:
    a main shaft having an interior cavity;
    a handle device to be removably coupled to the main shaft over the interior cavity;
    at least two concentric shafts to be disposed within an interior cavity of the main shaft;
    a housing adjacent the handle device, the housing comprising an engagement structure to receive corresponding shafts to form a tripod;
    an interface exposed upon removal of the handle device, the interface to receive an external component; and
    a tether attachment on the main shaft or the housing,
    a first configuration in which the handle device is coupled to the main shaft and the two concentric shafts are disposed within the interior cavity to form a trekking staff, and
    a second configuration in which the external component is coupled to the main shaft in place of the handle device and the two concentric shafts are received by the engagement structure with the main shaft so as to form a tripod, the tether attachment on the main shaft or the housing to attach to a tether for securing the tripod vertically downward to a ground surface below, the tether attachment located at or near the tripod apex formed by the main shaft and the first and second shafts.

16. A convertible trekking staff comprising:
    a main shaft having an interior cavity;
    a handle device to be removably coupled to the main shaft over the interior cavity;
    at least two concentric shafts to be disposed within an interior cavity of the main shaft;
    a housing adjacent the handle device, the housing comprising an engagement structure to receive corresponding shafts to form a tripod;
    an interface exposed upon removal of the handle device, the interface to receive an external component; and an adapter that attaches to one of the shafts in a first configuration or a second configuration, the adapter comprising:
    a dual lock that includes a first and second ball bearing attachment on opposing ends of the adapter;
    a clamp attached to the first ball bearing attachment, the clamp including resilient arms for clamping around a respective shaft;
    a holder for an electronic device attached to the second ball bearing attachment; and
    a locking structure to tighten the first and second ball bearing attachments and thus position the clamp and the holder in a desired position,
the first configuration in which the handle device is coupled to the main shaft and the two concentric shafts are disposed within the interior cavity to form a trekking staff, and
the second configuration in which the external component is coupled to the main shaft in place of the handle device and the two concentric shafts are received by the engagement structure with the main shaft so as to form a tripod.

* * * * *